US012164959B2

(12) United States Patent
Youn et al.

(10) Patent No.: US 12,164,959 B2
(45) Date of Patent: Dec. 10, 2024

(54) TASK EXECUTION METHOD AND ELECTRONIC DEVICE USING THE SAME

(71) Applicant: SAMSUNG ELECTRONICS CO., LTD., Suwon-si (KR)

(72) Inventors: Chan-Hyun Youn, Daejeon (KR); Seong-Hwan Kim, Daejeon (KR); Gyusang Cho, Daejeon (KR)

(73) Assignees: SAMSUNG ELECTRONICS CO., LTD., Suwon-si (KR); Korea Advanced Institute of Science and Technology, Daejeon (KR)

( * ) Notice: Subject to any disclaimer, the term of this patent is extended or adjusted under 35 U.S.C. 154(b) by 555 days.

(21) Appl. No.: 17/486,056

(22) Filed: Sep. 27, 2021

(65) Prior Publication Data

US 2022/0107839 A1  Apr. 7, 2022

(30) Foreign Application Priority Data

Oct. 6, 2020  (KR) .................. 10-2020-0128951

(51) Int. Cl.
*G06F 9/48* (2006.01)
*G06F 9/50* (2006.01)
*G06N 3/045* (2023.01)
*G06N 3/063* (2023.01)

(52) U.S. Cl.
CPC .......... *G06F 9/4887* (2013.01); *G06F 9/5066* (2013.01); *G06N 3/045* (2023.01); *G06N 3/063* (2013.01)

(58) Field of Classification Search
CPC .................................................. G06F 9/4887
See application file for complete search history.

(56) References Cited

U.S. PATENT DOCUMENTS

| 10,186,007 B2 | 1/2019 | Barik et al. |
| 10,552,161 B2 | 2/2020 | Bao et al. |
| 10,585,703 B2 | 3/2020 | Rossi et al. |
| 2019/0050735 A1 | 2/2019 | Ji et al. |

(Continued)

FOREIGN PATENT DOCUMENTS

| KR | 10-1879419 B1 | 8/2018 |
| KR | 10-2082411 B1 | 2/2020 |

OTHER PUBLICATIONS

He et al., arXiv: 1707.06168v2 [cs.CV] Aug. 27, 2017.

(Continued)

*Primary Examiner* — Charlie Sun
(74) *Attorney, Agent, or Firm* — Muir Patent Law, PLLC

(57) ABSTRACT

A task execution method includes receiving an execution request for a first task; analyzing the first task and dividing the first task into sub-tasks, the sub-tasks including a first sub-task and a second sub-task; calculating respective deadline times of the sub-tasks; scheduling the sub-tasks for processing by resources, the resources using neural networks; sequentially executing the sub-tasks using the resources and the neural networks; checking whether respective runtimes of the sub-tasks exceed a corresponding deadline time; and executing the second sub-task, subsequent to executing the first sub-task, using a first pruned neural network generated from the neural networks when the checking indicates that the runtime of the first sub-task exceeds the deadline time of the first sub-task.

20 Claims, 13 Drawing Sheets

(56) References Cited

U.S. PATENT DOCUMENTS

2019/0057308 A1    2/2019  Cho et al.
2020/0104184 A1    4/2020  Subramanian et al.
2022/0261637 A1*   8/2022  Liu ..................... G06F 9/30145

OTHER PUBLICATIONS

G. Nadarajan et al., "Semantics and planning based workflow composition for video processing", 2013.
Cho et al., Hybrid Resource Scheduling Scheme for Video Surveillance in GPU-FPGA Accelerated Edge Computing System, Oct. 15, 2021.

* cited by examiner

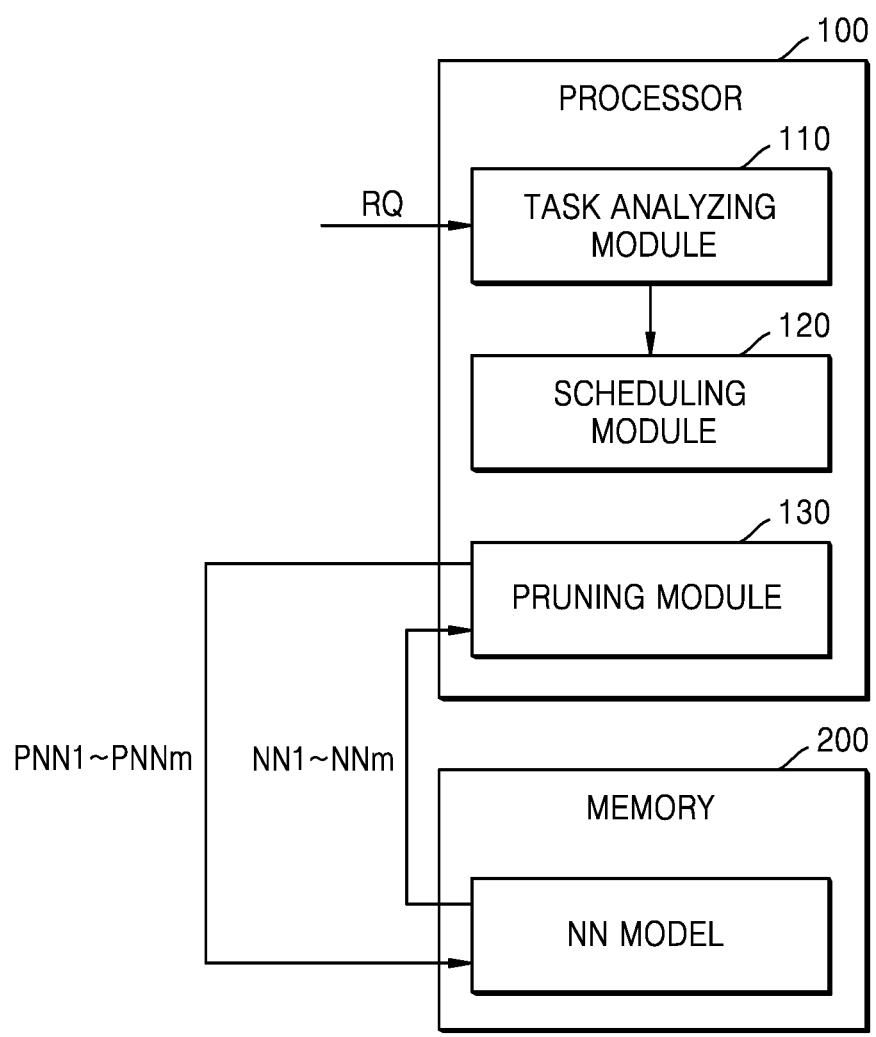

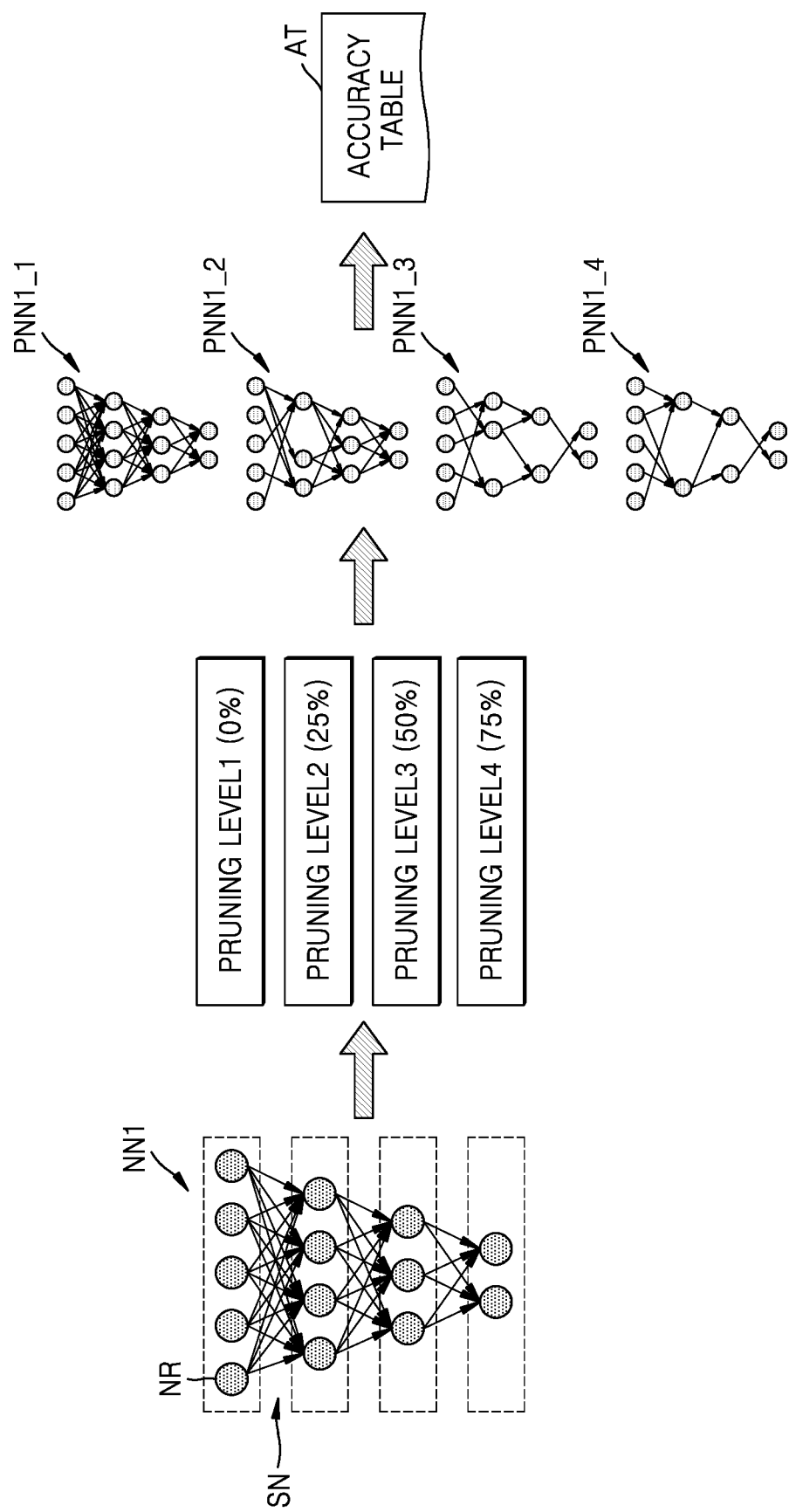

TASK EXECUTION METHOD AND ELECTRONIC DEVICE USING THE SAME

CROSS-REFERENCE TO RELATED APPLICATION

Korean Patent Application No. 10-2020-0128951, filed on Oct. 6, 2020, in the Korean Intellectual Property Office, and entitled: "Task Execution Method and Electronic Device Using the Same," is incorporated by reference herein in its entirety.

BACKGROUND

1. Field

Embodiments relate to a task execution method and an electronic device including the same.

2. Description of the Related Art

An artificial neural network may refer to a computing device or a method executed by a computing device to implement interconnected sets of artificial neurons. An artificial neuron may generate output data by performing simple operations on input data, and the output data may be transferred to other artificial neurons. As an example of an artificial neural network, a deep neural network or deep learning may have a multi-layer structure.

SUMMARY

Embodiments are directed to a task execution method, including: receiving an execution request for a first task; analyzing the first task and dividing the first task into sub-tasks, the sub-tasks including a first sub-task and a second sub-task; calculating respective deadline times of the sub-tasks; scheduling the sub-tasks for processing by resources, the resources using neural networks; sequentially executing the sub-tasks using the resources and the neural networks; checking whether respective runtimes of the sub-tasks exceed a corresponding deadline time; and executing the second sub-task, subsequent to executing the first sub-task, using a first pruned neural network generated from the neural networks when the checking indicates that the runtime of the first sub-task exceeds the deadline time of the first sub-task.

Embodiments are also directed to an electronic device, including: a plurality of resources including a field-programmable gate array and a graphics processing unit, the plurality of resources being configured to operate using neural networks; and a processor configured to analyze a first task, divide the first task into sub-tasks, calculate respective deadline times of the sub-tasks, and schedule the sub-tasks for processing by the plurality of resources using the neural networks. The processor is further configured to, when a runtime of a first sub-task from among the sub-tasks exceeds a deadline time of the first sub-task, schedule a second sub-task for execution subsequent to the first sub-task using a first pruned neural network, the first pruned neural network being generated by pruning a neural network corresponding to the second sub-task.

Embodiments are also directed to a task execution method, including: storing a plurality of neural networks and a plurality of pruned neural networks generated by pruning the plurality of neural networks; generating a workflow represented by sub-tasks that constitute a first task, when a request for the first task is received; sequentially scheduling each of the sub-tasks to one of a plurality of resources according to an execution order of the workflow, and controlling each of the plurality of resources to use a neural network corresponding to a scheduled sub-task; checking whether a runtime of the scheduled sub-task exceeds a deadline time of the scheduled sub-task; scheduling a next sub-task to one of the plurality of resources when the runtime of the scheduled sub-task does not exceed the deadline time of the scheduled sub-task; and when the runtime of the scheduled sub-task exceeds the deadline time of the scheduled sub-task, controlling one of the plurality of resources to process a next sub-task using a pruned neural network.

BRIEF DESCRIPTION OF THE DRAWINGS

Features will become apparent to those of skill in the art by describing in detail example embodiments with reference to the attached drawings in which:

FIG. 2 is a diagram showing a detailed configuration of a processor according to an example embodiment;

FIG. 7 is a diagram showing an operation of pruning a neural network using a plurality of pruning rates according to an example embodiment;

DETAILED DESCRIPTION

Figure 1:
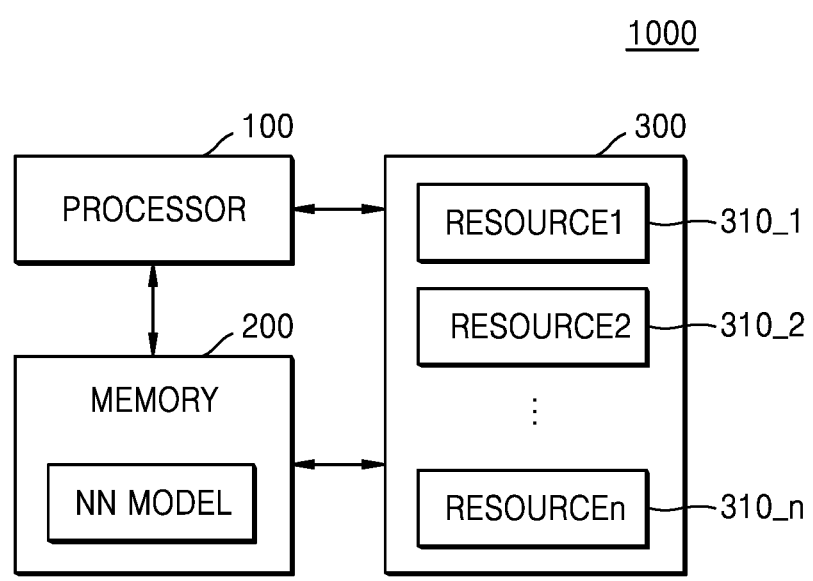
FIG. 1 is a diagram showing an electronic device according to an example embodiment.

FIG. 1 is a diagram showing an electronic device according to an example embodiment.

Referring to FIG. 1, an electronic device 1000 may include a processor 100, a memory 200, and a resource 300. In an example embodiment, the resource 300 may include n (n is a positive integer) resources 310_1, 310_2, . . . 310_n. The resource 300 may include various processing devices like a central processing unit (CPU), a graphics processing unit (GPU), an application processor (AP), a digital signal processor (DSP), a field-programmable gate array (FPGA), a neural network processing unit (NPU), an electronic control unit (ECU), and an image signal processor (ISP). The resources 310_1, 310_2, . . . 310_n may be the same or different types of calculation processing devices.

The electronic device 1000 may perform a function of extracting effective information by analyzing input data through an artificial neural network (ANN). The electronic device 1000 may be an AP employed in a mobile device. In another implementation, the electronic device 1000 may correspond to a computing system, a robot device like a drone or an advanced driver's assistance system (ADAS), a smart TV, a smartphone, a medical device, a mobile device, an image display device, a measurement device, an Internet of Things (IoT) device, and various other devices.

An ANN may refer to a computing system simulating a biological neural network that constitutes the brain of an animal. Unlike classical algorithms that perform tasks according to predefined conditions like rule-based programming, an ANN may learn to perform tasks by considering a plurality of samples (or examples). The ANN may have a structure in which artificial neurons (or neurons) are connected to one another, and connections between neurons may be referred to as synapses. A neuron may process a received signal and transmit a processed signal to other neurons through synapses. An output of a neuron may be referred to as "activation". A neuron and/or a synapse may have a variable weight, and the influence of a signal processed by a neuron may increase or decrease according to the weight. In particular, a weight related to an individual neuron may be referred to as a bias.

An ANN may include, but is not limited to, various types of neural networks like a convolution neural network (CNN) like GoogLeNet, AlexNet, ResNet, and VGG Network, a stacking-based deep neural network (S-DNN), a state-space dynamic neural network (S-SDNN), a deconvolution network, a deep belief network (DBN), a restricted Boltzmann Machine (RBM), a fully convolutional network, a long short-term memory (LSTM) network, a generative adversarial network (GAN), an inception V3 (IV3) network, a classification network, etc. Also, a neural network executing one task may include sub-neural networks, and the sub-neural networks may be implemented by homogeneous or heterogeneous neural networks.

The processor 100 controls all operations of the electronic device 1000. The processor 100 may include a single core or multi-cores. The processor 100 may process or execute programs and/or data stored in the memory 200. In an example embodiment, the processor 100 may control functions of the electronic device 1000 by executing programs stored in the memory 200.

The memory 200 may include at least one of a volatile memory and a non-volatile memory. The non-volatile memory includes read only memory (ROM), programmable ROM (PROM), electrically programmable ROM (EPROM), electrically erasable and programmable ROM (EEPROM), flash memory, phase-change random access memory (PRAM), magnetic RAM (MRAM), a resistive RAM (RRAM), ferroelectric RAM (FeRAM), etc. The volatile memory includes dynamic RAM (DRAM), static RAM (SRAM), synchronous DRAM (SDRAM), PRAM, MRAM, RRAM, FeRAM, etc. According to example embodiments, the memory 200 may include at least one of a hard disk drive (HDD), a solid state drive (SSD), a compact flash (CF) storage, a secure digital (SD) storage, a micro secure digital (Micro-SD) storage, a mini secure digital (Mini-SD) storage, an extreme digital (xD) storage, and a memory stick.

The processor 100 may receive a task execution request from the outside. In response to the task execution request, the processor 100 may analyze a requested task, divide the requested task into a plurality of sub-tasks, and allocate the sub-tasks to the resources 310_1, 310_2, ... 310_n. The resources 310_1, 310_2, ... 310_n may process the allocated sub-tasks using neural networks respectively corresponding to the allocated sub-tasks.

When the resources 310_1, 310_2, ... 310_n execute the allocated sub-tasks, it may take longer than expected or a temporary error may occur. As a result, the runtime of an entire task (i.e., a first task) may become slightly longer. According to the present example embodiment, the processor 100 may take measures to prevent the runtime of an entire task from being prolonged even when an exceptional situation, as stated above, occurs. Hereinafter, measures taken by the processor 100 will be described in detail.

According to an example embodiment, the processor 100 may calculate a deadline time of each of a plurality of sub-tasks. Next, for each of the sub-tasks, the processor 100 may measure a runtime, which is a time elapsed for a resource to which a corresponding sub-task is allocated (from among the resources 310_1, 310_2, ... 310_n) to execute the corresponding sub-task. The processor 100 may compare a deadline time to a runtime of each of the sub-tasks, and determine whether the runtime exceeds the deadline time.

When the runtime of a particular sub-task (e.g., the first sub-task) from among the sub-tasks exceeds the deadline time thereof, the processor 100 may operate to process a resource, to which another sub-task (e.g., a second sub-task) subsequent to the corresponding sub-task is allocated, using a pruned neural network. Here, the pruned neural network refers to a neural network from which some of nodes constituting an existing neural network are removed. When data is processed using a pruned neural network, the number of calculations may be reduced compared to a case of using an existing neural network, and thus a runtime may be reduced.

In an example embodiment, both the existing neural network, which is not pruned, and the pruned neural network may be stored in the memory 200. When the resources 310_1, 310_2, ... 310_n are GPUs, an allocated sub-task may be executed by selectively loading one of the existing neural network and the pruned neural network under the control of the processor 100. When the resources 310_1, 310_2, ... 310_n are FPGAs, the resources 310_1, 310_2, ... 310_n may be programmed to either an existing neural network or a pruned neural network under the control of the processor 100.

Although FIG. 1 shows that the electronic device 1000 includes the resource 300, embodiments are not limited thereto. For example, the resource 300 may be a component separate from the electronic device 1000, and the electronic device 1000 may be implemented to perform a task through communication with the resource 300.

As described above, in the electronic device 1000 according to the present example embodiment, when a delay occurs while a task is being performed using a neural network and a plurality of resources, the task may be processed at a relatively faster rate using a pruned neural network in a subsequent process.

Figure 3A:
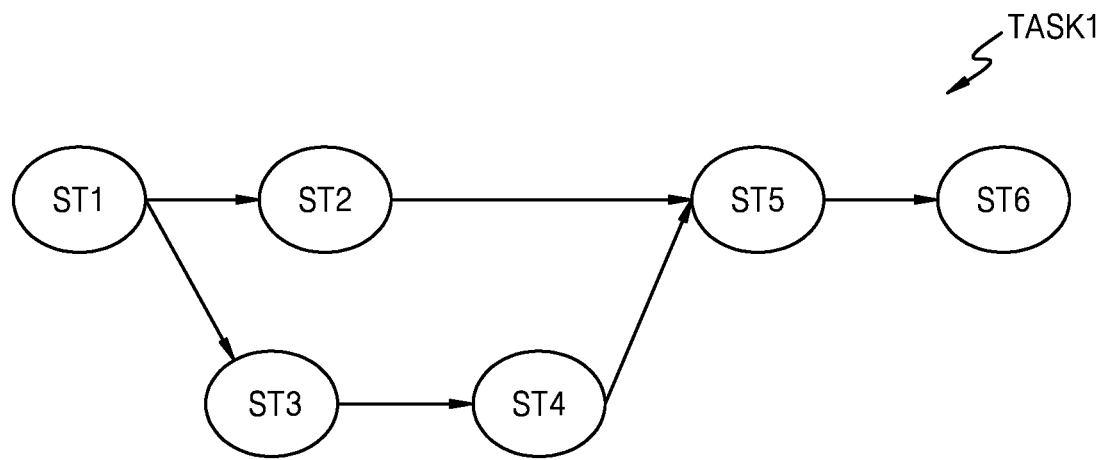
FIG. 3A is a diagram showing a task expressed as a workflow, according to an example embodiment.
Figure 3B:
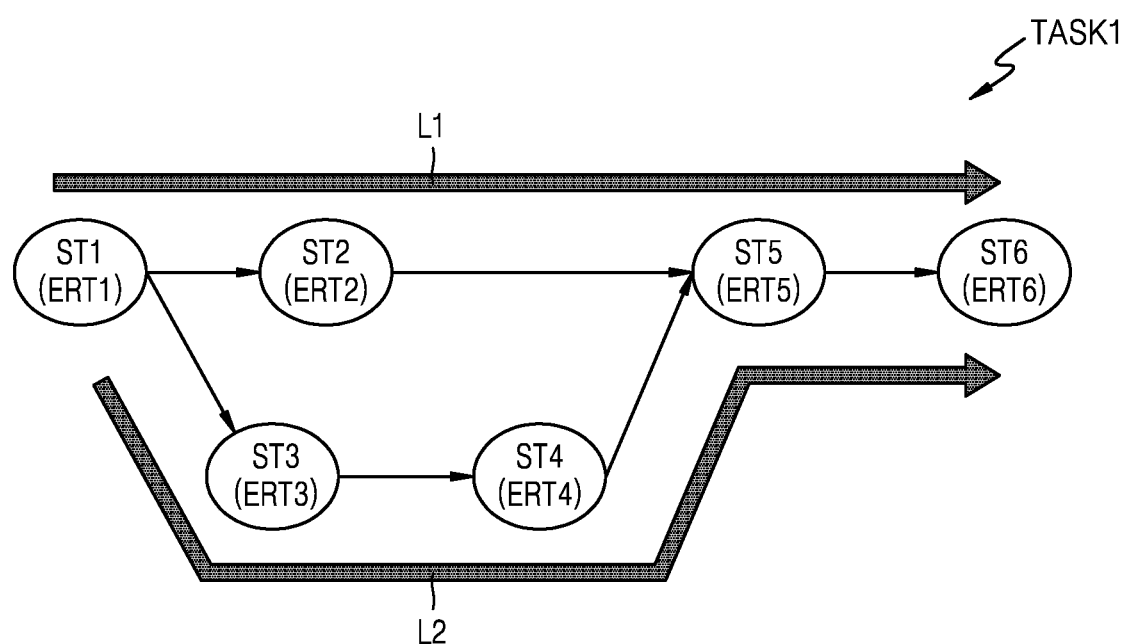
FIG. 3B is a diagram showing paths of a workflow according to an example embodiment.

FIG. 2 is a block diagram showing a detailed configuration of a processor according to an example embodiment. FIG. 3A is a diagram showing a task expressed as a workflow, according to an example embodiment. FIG. 3B is a diagram showing paths of a workflow according to an example embodiment.

Referring to FIG. 2, the processor 100 may include a task analyzing module 110, a scheduling module 120, and a neural network pruning module 130.

The task analyzing module 110 provides a function of dividing a target task into a plurality of sub-tasks. For example, when the task analyzing module 110 receives an execution request RQ for a first task from the outside, the task analyzing module 110 may analyze the first task. In an example embodiment, the task analyzing module 110 may divide a first task into a plurality of sub-tasks based on various criteria like types and sizes of input and output data, types of calculations, and types of neural networks used for processing tasks, etc. The task analyzing module 110 may generate a workflow to which an order of executing the sub-tasks is reflected. For example, the workflow may be implemented in the form of a directed acyclic graph (DAG).

Referring to FIG. 3A, the first task expressed as a workflow includes nodes representing six sub-tasks ST1 to ST6. The workflow of the first task starts at the first sub-task ST1, which is a first node, and is completed at the sixth sub-task ST6, which is the last node. Also, in the workflow of the first task, the first node is connected to a node representing the second sub-task ST2 and a node representing the third sub-task ST3. Thus, when the first sub-task ST1 is completed, the second sub-task ST2 may be performed in parallel with the third sub-task ST3. In the workflow of the first task, the fifth node is connected to a node representing the second sub-task ST2 and a node representing the fourth sub-task ST4. Thus, when the second sub-task ST2 and the fourth sub-task ST4 are completed, the fifth sub-task ST5 may be performed.

The task analyzing module 110 also provides a function of calculating deadline times of a plurality of sub-tasks. In an example embodiment, the task analyzing module 110 may calculate deadline times of a plurality of sub-tasks by using a workflow. For example, the task analyzing module 110 may first calculate expected runtimes of the sub-tasks. The task analyzing module 110 may calculate deadline times of the sub-tasks based on the expected runtime of the sub-tasks. In an example embodiment, a deadline time may be the same as or similar to an expected runtime.

The expected runtimes of the sub-tasks may be calculated based on a previous history of executing sub-tasks that are the same as, or similar to, the sub-tasks. Because the runtime of a particular sub-task may vary depending on a resource that the particular sub-task is processed by, the expected runtime of the particular sub-task may be calculated using runtimes corresponding to cases where the resources 310_1, 310_2, . . . 310_n perform the particular sub-task. For example, an average of the runtime for the first resource 310_1, which is an FPGA, and the runtime for the second resource 310_2, which is a GPU, may be calculated as the expected runtime of the corresponding sub-task. However, the method of calculating the expected runtime of a sub-task using runtimes for the resources 310_1, 310_2, . . . 310_n is not limited to the above-described example, and weights may be applied to respective resources according to embodiments.

In another example, the task analyzing module 110 may calculate a deadline time of each of the sub-tasks by additionally considering the expected runtime of the first task. For example, the task analyzing module 110 may identify all paths in the workflow of the first task, and determine the longest expected runtime from among identified paths as the expected runtime of the first task. Here, a path refers to a route starting from a first sub-task of a workflow and arriving at the last sub-task, and the expected runtime of each path may be calculated as the sum of expected runtimes of sub-tasks constituting the path. The task analyzing module 110 may calculate ratios of the expected runtimes of the sub-tasks with respect to the expected runtime of the first task and calculate deadline times corresponding to the calculated ratios.

In an example embodiment, with respect to the method of determining the expected runtime of the first task, the task analyzing module 110 may identify a critical path, which is the path with the longest expected runtime from among all paths, and determine the expected runtime of the critical path as the expected runtime of the first task.

For example, referring to FIG. 3B, the first task may include a first path L1 consisting of <first sub-task ST1-second sub-task ST2-fifth sub-task ST5-sixth sub-task ST6> and a second path L2 consisting of <first sub-task ST1-third sub-task ST3-fourth sub-task ST4-fifth sub-task ST5-sixth sub-task ST6>.

An expected runtime of the first path L1 is the same as the sum of an expected runtime ERT1 of the first sub-task ST1, an expected runtime ERT2 of the second sub-task ST2, an expected runtime ERT5 of the fifth sub-task ST5, and an expected runtime ERT6 of the sixth sub-task ST6.

An expected runtime of the second path L2 is the same as the sum of the expected runtime ERT1 of the first sub-task ST1, an expected runtime ERT3 of the third sub-task ST3, an expected runtime ERT4 of the fourth sub-task ST4, the expected runtime ERT5 of the fifth sub-task ST5, and the expected runtime ERT6 of the sixth sub-task ST6.

When the expected runtime ERT2 of the second sub-task ST2 is less than the sum of the expected runtime ERT3 of the third sub-task ST3 and the expected runtime ERT4 of the fourth sub-task ST4, the second path L2 is the critical path. Otherwise, the first path L1 is the critical path.

When the first path L1 is a critical path, the task analyzing module 110 may calculate ratios of the expected runtimes ERT1 to ERT6 of the first to sixth sub-tasks ST1 to ST6 with respect to the expected runtime of the first path L1, and calculate deadline times corresponding to the calculated ratios.

Equation 1 below may be used to calculate a deadline time of a sub-task.

$$T^{ae}(STi) = D \cdot \frac{T^{ee}(STi)}{\sum_{ST_i \in L_c} T^{ee}(STi)} \quad \text{[Equation 1]}$$

Here, $T^{ae}(STi)$ denotes a deadline time of an i-th sub-task STi, D is a constant number, $T^{ee}(STi)$ denotes an expected runtime of the i-th sub-task STi, and Lc denotes a c-th path. D may be set by a user or a manufacturer, and may be changed.

The scheduling module 120 provides a function of scheduling sub-tasks constituting a task to the resources 310_1, 310_2, . . . 310_n. For example, the scheduling module 120 may receive information regarding the workflow of the first task from the task analyzing module 110, and sequentially schedule a plurality of sub-tasks to the resources 310_1, 310_2, . . . 310_n, according to an execution order of the workflow.

The scheduling operation of the scheduling module 120 may include an operation of allocating sub-tasks to queues of the resources 310_1, 310_2, . . . 310_n. The scheduling module 120 may be implemented to allocate a next sub-task to one of the queues of the resources 310_1, 310_2, . . . 310_n after one sub-task is completed, instead of allocating all sub-tasks to the queues of the resources 310_1, 310_2, . . . 310_n at a certain time point. For example, referring to FIG. 3A, the scheduling module 120 may allocate the first sub-task ST1 to a queue of one of the resources 310_1, 310_2, . . . 310_n and, when processing of the first sub-task ST1 is completed, allocate the second sub-task ST2 and the third sub-task ST3 to queues of two of the resources 310_1, 310_2, . . . 310_n.

The scheduling module 120 may provide information regarding a neural network that is used to perform a sub-task to the resources 310_1, 310_2, . . . 310_n. The resources 310_1, 310_2, . . . 310_n may perform scheduled sub-tasks using a neural network based on information received from the scheduling module 120. When sub-tasks are scheduled to the resources 310_1, 310_2, . . . 310_n, the scheduling module 120 may allocate the sub-tasks considering operation states of the resources 310_1, 310_2, . . . 310_n, and detailed descriptions thereof will be given below with reference to FIG. 4.

The scheduling module 120 may perform scheduling to adaptively use a pruned neural network based on the deadline times of the sub-tasks. For example, the scheduling module 120 may check whether the runtimes of the sub-tasks exceed the deadline times of the sub-tasks, and control the resources 310_1, 310_2, . . . 310_n to perform the remaining sub-tasks using a pruned neural network according to a result of the checking. In an example embodiment, when the runtime of a first sub-task exceeds the deadline time of the first sub-task or an error occurs while the first sub-task is being executed, the scheduling module 120 may control one of the resources 310_1, 310_2, . . . 310_n to process at least one (e.g., a second sub-task) of sub-tasks subsequent to the first sub-task using a pruned neural network.

The neural network pruning module 130 provides a function of pruning neural networks. Because the function of pruning neural networks takes time, the function is performed in advance, prior to a task execution request. Also, because neural networks used are different according to types of sub-tasks, the neural network pruning module 130 may individually perform pruning for each of different neural networks. For example, the neural network pruning module 130 may read neural networks NN1 to NNm stored in the memory 200, and individually perform pruning to generate pruned neural networks PNN1 to PNNm. The generated pruned neural networks PNN1 to PNNm may be stored in the memory 200. However, embodiments are not limited thereto, and the pruned neural networks PNN1 to PNNm may be programmed to FPGAs from among the resources 310_1, 310_2, . . . 310_n. The neural network pruning module 130 may provide information regarding the neural networks NN1 to NNm and the pruned neural networks PNN1 to PNNm to the scheduling module 120, and the scheduling module 120 may perform scheduling based on the information.

Although FIG. 2 shows that the neural network pruning module 130 generates m pruned neural networks PNN1 to PNNm for m neural networks NN1 to NNm, embodiments are not limited thereto. For example, the neural network pruning module 130 may generate a plurality of pruned neural networks with a plurality of different pruning rates for one neural network. Detailed descriptions thereof will be given below with respect to FIG. 7.

Each of the task analyzing module 110, the scheduling module 120, and the neural network pruning module 130 may be implemented by a logic block implemented through logic synthesis, a software block performed by a processor, or a combination thereof. In an example embodiment, each of the task analyzing module 110, the scheduling module 120, and the neural network pruning module 130 may be a procedure including a set of a plurality of instructions executed by the processor 100 and may be stored in the memory 200.

Figure 4:
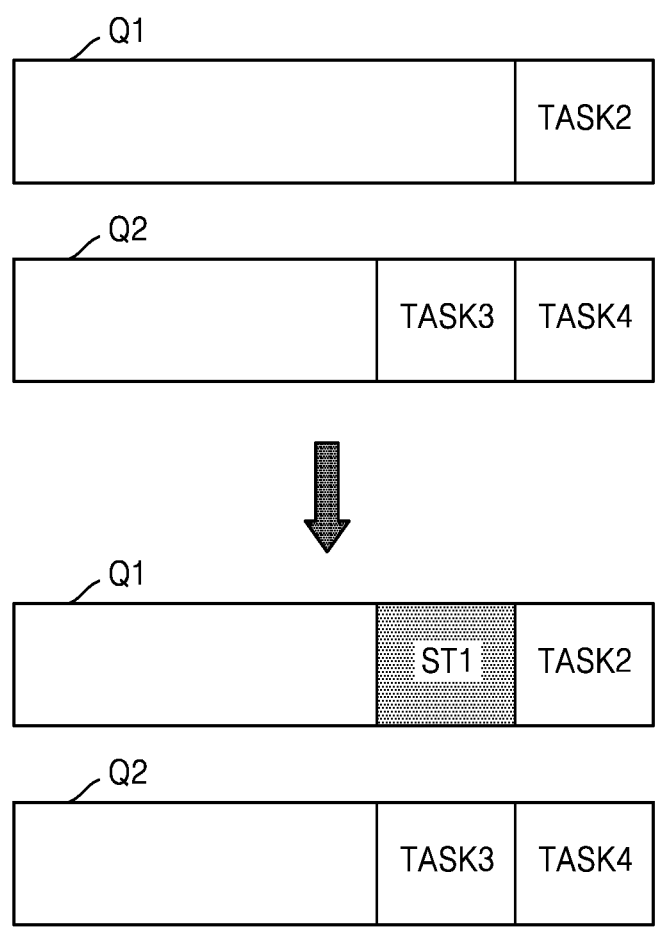
FIG. 4 is a diagram for describing a scheduling operation according to an example embodiment.

FIG. 4 is a diagram for describing a scheduling operation according to an example embodiment. For example, FIG. 4 is a diagram for describing a scheduling operation of the scheduling module 120 of FIG. 2. In FIG. 4, for convenience of explanation, it is assumed that the resource 300 includes only a first resource 310_1 and a second resource 310_2.

The scheduling module 120 may schedule sub-tasks of a first task, considering operating states of the first resource 310_1 and the second resource 310_2. For example, the scheduling module 120 may allocate a sub-task (e.g., the first sub-task ST1) to a resource (from among the first resource 310_1 and the second resource 310_2) that is expected to process the allocated sub-task faster. Thus, the scheduling module 120 may allocate the first sub-task ST1 to a resource that is expected to exhibit lower latency, from among the first resource 310_1 and the second resource 310_2.

To this end, the scheduling module 120 may check a queue Q1 of the first resource 310_1 and a queue Q2 of the second resource 310_2. Tasks to be processed in the future by the first resource 310_1 and the second resource 310_2 are arranged in the queues Q1 and Q2, and the queues Q1 and Q2 may be implemented as first-in, first-out (FIFO), for example. Because the first resource 310_1 and the second resource 310_2 may process a plurality of tasks, tasks arranged in the queues Q1 and Q2 may be tasks different from the first task. The scheduling module 120 may calculate expected runtimes of tasks arranged in the queues Q1 and Q2, and allocate the first sub-task ST1 to a resource corresponding to a shorter expected runtime.

For example, referring to FIG. 4, a second task TASK2 is in the queue Q1 of the first resource 310_1, and a third task TASK3 and a fourth task TASK4 are in the queue Q2 of the second resource 310_2. The scheduling module 120 may calculate expected runtimes of the second task TASK2, the third task TASK3, and the fourth task TASK4 based on previous execution history of tasks that are the same as or similar to the second task TASK2, the third task TASK3, and the fourth task TASK4, respectively. Next, the scheduling module 120 may determine the expected runtime of the second task TASK2 as the expected runtime for the first resource 310_1, and determine the sum of the expected runtime of the third task TASK3 and the expected runtime of the fourth task TASK4 as the expected runtime for the second resource 310_2. When the expected runtime for the second resource 310_2 is longer, the scheduling module 120 may allocate the first sub-task ST1 to the first resource 310_1.

In another example, the scheduling module 120 may schedule the first sub-task ST1 by additionally considering a difference between expected runtimes for the first resource 310_1 and the second resource 310_2 according to types or performance thereof. For example, the scheduling module 120 may select a resource to schedule a task using Equation 2 below.

$$r_{alloc} = \text{argmin}_{r \in \{FPGA, GPU\}} T_r^{ee}(STi) + \Sigma_{k \in W_r} T_r^{ee} * T_k) \quad \text{[Equation 2]}$$

Subject to $T_r^{ee}(STi) \leq T^{ae}(STi)$

Here, r denotes each of the resources 310_1, 310_2, . . . 310_n, ralloc denotes a resource selected from among the resources 310_1, 310_2, . . . 310_n, argmin r(X) denotes a function for obtaining a resource r having the smallest value for X, $T_r$ee (STi) denotes an expected runtime of an i-th sub-task STi for each resource, $T_r^{ee}(T_k)$ denotes an expected runtime of a K-th task TK from among other tasks Wr waiting for each resource, and $T^{ae}(STi)$ denotes a deadline time of the i-th sub-task STi. Although the above equation states that the resources 310_1, 310_2, . . . 310_n include one FPGA and one GPU, it is merely an example, and the resources 310_1, 310_2, . . . 310_n may include a plurality of FPGAs and a plurality of GPUs, and may also include other types of resources.

The scheduling module 120 may calculate latencies LT1 and LT2 of the first resource 310_1 and the second resource 310_2 using the above equation, and may allocate the first sub-task ST1 to a resource with lower latency.

Figure 5:
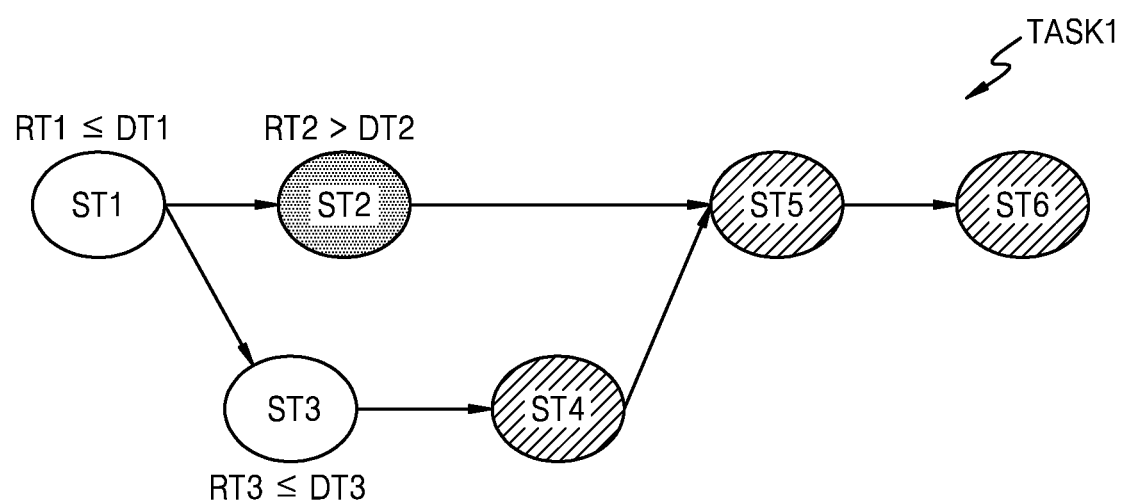
FIG. 5 is a diagram for describing an operation of a scheduling module for identifying the runtime for each sub-task according to an example embodiment.

FIG. 5 is a diagram for describing an operation of a scheduling module for identifying the runtime for each sub-task according to an example embodiment.

Referring to FIG. 5, the scheduling module 120 may allocate the first sub-task ST1 to one of the resources 310_1, 310_2, . . . 310_n, and may identify a runtime RT1 of the first sub-task ST1. Here, the runtime refers to a time from a starting time of a sub-task to a completion time or an error occurrence time of the sub-task.

When the scheduling module 120 confirms that the runtime RT1 of the first sub-task ST1 is less than or equal to the deadline time DT1, the second sub-task ST2 and the third sub-task ST3 may be scheduled to the resources 310_1, 310_2, . . . 310_n. Next, the scheduling module 120 may identify runtimes RT2 and RT3 of the second sub-task ST2 and the third sub-task ST3, respectively.

As shown in FIG. 5, the runtime RT3 of the third sub-task ST3 is less than or equal to the deadline time DT3, but the runtime ST2 of the second sub-task ST2 may exceed the deadline time DT2. Therefore, the scheduling module 120 may determine that a time delay has occurred during execution of the second sub-task ST2, and may control the resources 310_1, 310_2, . . . 310_n to process at least one of subsequent sub-tasks using a pruned neural network.

For example, referring to FIG. 5, the scheduling module 120 may check sub-tasks subsequent to the second sub-task ST2 based on the workflow of the first task. Subsequent sub-tasks may include not only sub-tasks that may be executed after a sub-task with a time delay is completed, but also sub-tasks that may be performed in parallel with the sub-task with the time delay and are not yet allocated to the resources 310_1, 310_2, . . . 310_n.

The fourth sub-task ST4 is a sub-task that is executed in parallel with the second sub-task ST2. However, when a time delay occurs during execution of the second sub-task ST2 and the third sub-task ST3 is not completed, the fourth sub-task ST4 may also correspond to a subsequent sub-task. The fifth sub-task ST5 and the sixth sub-task ST6, which may be performed only when the second sub-task ST2 is completed, may correspond to subsequent sub-tasks. The scheduling module 120 may control the resources 310_1, 310_2, . . . 310_n to process at least one of the fourth sub-task ST4, the fifth sub-task ST5, and the sixth sub-task ST6 using a pruned neural network.

Figure 6A:
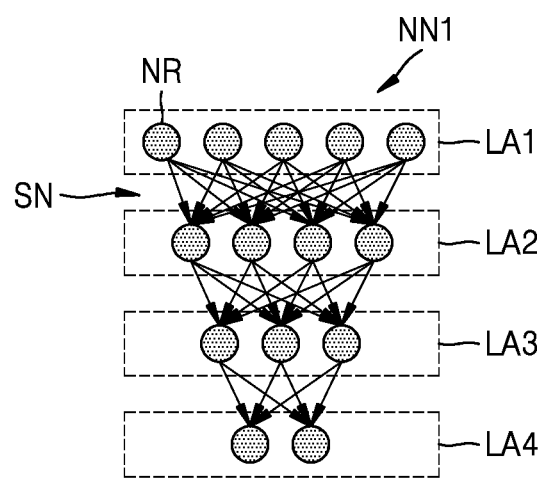
FIG. 6A is a diagram showing a configuration of a neural network according to an example embodiment.
Figure 6B:
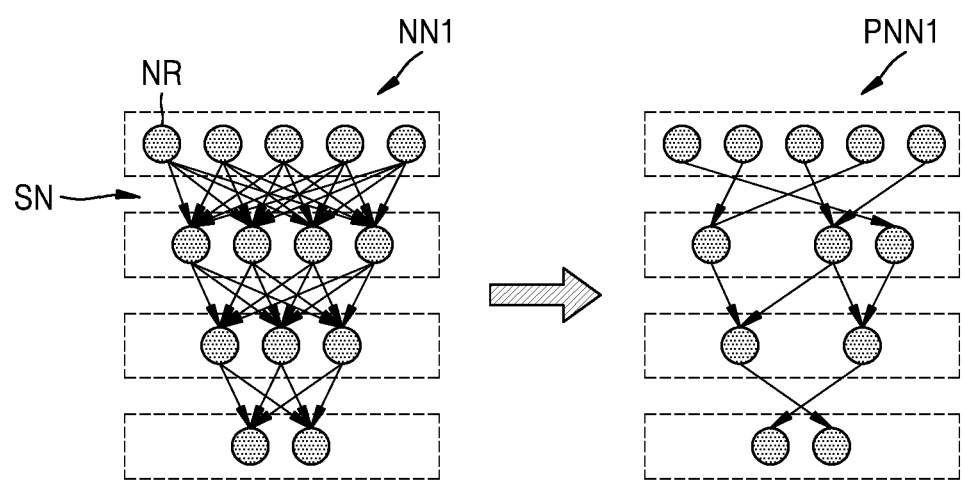
FIG. 6B is a diagram showing an operation of pruning a neural network according to an example embodiment.

FIG. 6A is a diagram showing a configuration of a neural network according to an example embodiment. FIG. 6B is a diagram showing an operation of pruning a neural network according to an example embodiment.

Referring to FIG. 6A, a first neural network NN1 may include a plurality of layers L1 to L4, and the layers L1 to L4 may each include at least one neuron NR. An output of each layer may be input to a subsequent layer through a synapse SN. For example, a first layer L1 may process input data for the first neural network NN1 and provide an output to a second layer L2 through the synapse SN, and the second layer L2 may provide an output to a third layer L3 through the synapse SN. Finally, a fourth layer L4 may output data of the first neural network NN1.

Referring to FIG. 6B, the neural network pruning module 130 of FIG. 2 may prune the neuron NR and the synapse SN of the first neural network NN1 using a first pruning rate. In an example embodiment, the neural network pruning module 130 may prune the neuron NR and the synapse SN based on weights of the neurons NR and the synapse SN. This assumes that, even when the neuron NR and the synapse SN with small weight values are pruned, the overall network performance will not be significantly deteriorated. On the other hand, even a small weight value may significantly influence the accuracy of an entire artificial neural network. Therefore, the neural network pruning module 130 may calculate the sensitivity of the first neural network NN1 and the accuracy of a first pruned neural network PNN1, and change the neuron NR and the synapse SN to be pruned according to the calculated sensitivity and the calculated accuracy. Here, the sensitivity refers to a degree to which output data of a neural network is affected as a particular neuron NR and a particular synapse SN are pruned.

The neural network pruning module 130 may generate a plurality of pruned neural networks with a plurality of different pruning rates for one neural network. Detailed descriptions thereof will be given below with reference to FIG. 7.

Although FIGS. 6A and 6B show that the neural network includes 4 layers, embodiments are not limited thereto, and the neural network may include, e.g., 3 or less layers, or 5 or more layers.

FIG. 7 is a diagram showing an operation of pruning a neural network using a plurality of pruning rates according to an example embodiment.

Referring to FIG. 7, the neural network pruning module 130 may perform a pruning operation using a plurality of pruning rates for a neural network that is not pruned. The pruning rate refers to a degree that an existing neural network is pruned. The higher the pruning rate, the greater the number of neurons and synapses that are pruned.

For example, referring to FIG. 7, the neural network pruning module 130 may prune the first neural network NN1 according to four pruning levels (LEVEL1 through LEVEL4). The four pruning levels may correspond to a pruning rate of 0%, a pruning rate of 25%, a pruning rate of 50%, and a pruning rate of 75%, respectively. The pruning rate of 0% may indicate that pruning is not performed, e.g., the number of neurons and synapses remains unchanged. The first pruned neural network PNN1_1 pruned at the pruning rate of 0% may be the same as the first neural network NN1. The neural network pruning module 130 may generate a second pruned neural network PNN1_2 by pruning the first neural network NN1 at the pruning rate of 25%, generate a third pruned neural network PNN1_3 by pruning the first neural network NN1 at the pruning rate of 50%, and generate a fourth pruned neural network PNN1_4 by pruning the first neural network NN1 at the pruning rate of 75%.

Although FIG. 7 shows a case where four pruning rates are used, embodiments are not limited thereto, and the number of pruning rates may be, e.g., 3 or less, or 5 or more.

In an example embodiment, the neural network pruning module 130 may calculate n pruning rates within a predetermined range. For example, the neural network pruning module 130 may calculate n pruning rates using Equation 3 below.

$$D_{prune} = \left\{ p_{min} + \left( \frac{p_{max} - p_{min}}{n-1} \right) \times t \mid t \in \{0, 1, 2, \ldots, n-1\} \right\}$$ [Equation 3]

Here, $D_{prune}$ denotes a set of pruning rates, pmin denotes the minimum pruning rate within a pruning rate range, pmax denotes the maximum pruning rate within the pruning rate range, and n is a positive integer. Referring to Equation 3, $D_{prune}$ may include pmin as a first pruning rate, pmax as an n-th pruning rate, and n−2 pruning rates increasing from pmin to pmax in arithmetic sequence.

A set of pruned neural networks generated using n pruning rates as described above is as shown in Equation 4 below.

$$M = \{M_d \mid d \in D_{prune}\}$$ [Equation 4]

Here, M denotes a set of pruned neural networks, and d denotes a pruning rate belonging to the set of pruning rates.

Next, the neural network pruning module 130 may perform learning on the pruned neural networks generated using the n pruning rates. Training data used to perform learning on the pruned neural networks may be the same as training data used in learning of the existing neural network (e.g., NN1). However, embodiments are not limited thereto, and training data that is different from the training data used to perform learning on the existing neural network may be used.

Next, the neural network pruning module 130 may measure the accuracy for each of the pruned neural networks that are generated using the n pruning rates. In an example embodiment, a relationship between n pruning rates and accuracies of pruned neural networks generated using the n pruning rates may be expressed by Equation 5 below.

$$ACC_{prune}(M_d) = \theta_{i,4} + \frac{\theta_{i,1} - \theta_{i,4}}{1 + \left(\frac{d}{\theta_{i,3}}\right)^{\theta_{i,2}}}$$ [Equation 5]

Here, $Acc_{prune}(M_d)$ denotes the accuracy of a pruned neural network Md, and d denotes a pruning rate of the pruned neural network Md. Parameters $\theta_{i,1}$, $\theta_{i,2}$, $\theta_{i,3}$, and $\theta_{i,4}$ determine a relationship between a pruning rate and accuracy, and may be experimentally derived. Referring to Equation 5, a relationship between a pruning rate and accuracy may be expressed in the form of a symmetrical sigmoid and/or a four-parameter logistic curve. However, equations expressing a relationship between a pruning rate and accuracy are not limited to the above-described example, and a relationship between a pruning rate and accuracy may be expressed by equations including more or fewer parameters.

Referring again to FIG. 7, the neural network pruning module 130 may generate calculated accuracies of the pruned neural networks PNN1_2, PNN1_3, and PNN1_3 and store them in the form of an accuracy table AT. Next, the neural network pruning module 130 may provide the generated accuracy table AT to the scheduling module 120, and the scheduling module 120 may perform scheduling using the accuracy table AT when a time delay occurs.

In an example embodiment, the scheduling module 120 may identify a pruned neural network that maximizes accuracy while ensuring a degree that a runtime is delayed compared to a deadline time, and may schedule using the identified pruned neural network.

For example, first, the scheduling module 120 may calculate an expected runtime when a pruned neural network is used, by using Equation 6 below.

$$T_{prune}(M_d, p_{comp}) = \sum_{k \in K} \frac{op^k \cdot C_T^k}{p_{comp}}$$ [Equation 6]

Here, Tprune(Mn, pcomp) denotes an expected runtime when the pruned neural network Md is used, pcomp denotes floating-point operations per second (FLOPS) of each resource, $op^k$ denotes a FLOPS of a k-th layer, and $C_T^k$ denotes a pruning index for the k-th layer determined by d of Equation 4.

The scheduling module 120 may identify a suitable pruned neural network using Equation 7 below.

$$d_{assign} = \mathrm{argmax}_d(ACC_{prune}(M_d))$$ [Equation 7]

subject to $$T_{RT}(STi) - T^{ae}(STi) + \Sigma_{k \in W_{GPU}} T_k^{ee}(T_K) \le T_{prune}(M_0, p_{comp}) - T_{prune}(M_d, p_{comp})$$ [Equation 7]

Here, $T_{RT}(STi)$ denotes a runtime of the i-th sub-task STi in which a delay has occurred, $T^{ae}(STi)$ denotes a deadline time of the i-th sub-task STi, $T_k^{ee}(T_K)$ denotes an expected runtime of a K-th task TK from among other tasks WGPU waiting on a GPU, $T_{prune}(M_0, p_{comp})$ denotes an expected runtime of a pruned neural network M0 (i.e., an existing neural network that is not pruned), $T_{prune}(M_d, P_{comp})$ denotes an expected runtime of a pruned neural network Md (i.e., a pruned neural network corresponding to the pruning rate d), $Acc_{prune}(M_d)$ denotes the accuracy of the pruned neural network Md, and argmax d(X) denotes a function for obtaining the pruning rate d with the maximum value X.

Referring to Equation 7 above, the scheduling module 120 may determine a pruning rate with the maximum accuracy under the condition that a sum of the delay of the runtime of the i-th sub-task STi and runtimes of other tasks waiting on the GPU is less than a degree of expected reduction of runtime due to use of a pruned neural network.

As described above in relation to Equation 7 above, the resource is a GPU. Because it takes time for a FPGA to implement a pruned neural network, an FPGA may be excluded from scheduling of a sub-task using a pruned neural network in an example embodiment.

As described above, the scheduling module 120 according to an example embodiment may select a pruned neural network with high accuracy, under the condition that a sum of a time delay and expected runtimes of other tasks waiting in a queue is less than a runtime expected to decrease when a particular pruned neural network is used.

According to another example embodiment, when there are a plurality of sub-tasks subsequent to a sub-task in which a delay has occurred, a pruned neural network with high accuracy without the above-stated condition may be selected for any one of the subsequent sub-tasks. Also, when the time delay is not certain as a pruned neural network with high accuracy is selected, the remaining subsequent sub-tasks may also be scheduled to use a pruned neural network. Detailed descriptions thereof will be given below with respect to FIG. 9.

Figure 8:
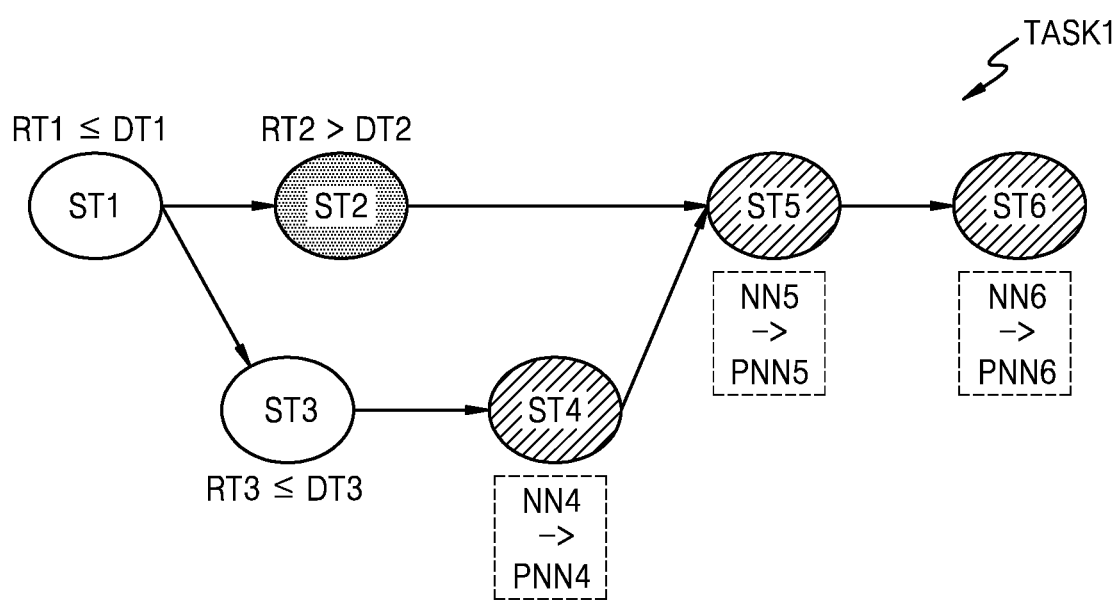
FIG. 8 is a diagram for describing a scheduling operation of a scheduling module according to an example embodiment.

FIG. 8 is a diagram for describing a scheduling operation of a scheduling module according to an example embodiment.

Referring to FIG. 8, because a delay has occurred in the second sub-task ST2 as described above with reference to FIG. 5, the scheduling module 120 may control the resources 310_1, 310_2, ... 310_n to use a pruned neural network for at least one of subsequent sub-tasks, that is, the fourth sub-task ST4, the fifth sub-task ST5, and the sixth sub-task ST6. Because the fourth sub-task ST4, the fifth sub-task ST5, and the sixth sub-task ST6 are different tasks, neural networks used for processing them may be different from one another. Therefore, pruned neural networks used for the fourth sub-task ST4, the fifth sub-task ST5, and the sixth sub-task ST6 may also be different from one another.

In an example embodiment, the scheduling module 120 may select a pruned neural network with high accuracy for the fourth sub-task ST4. However, when a time delay in the second sub-task ST2 is long and the total runtime is still long even though the selected pruned neural network is used for the fourth sub-task ST4, pruned neural networks may also be selected for the fifth sub-task ST5 and the sixth sub-task ST6. In this case, a method of selecting pruned neural networks may be a method of selecting pruned neural networks by applying the conditions as described above with reference to FIG. 7 or may be a method of selecting pruned neural networks that considers only accuracy.

For example, referring to FIG. 8, when the scheduling module 120 determines to use pruned neural networks for all of the fourth sub-task ST4, the fifth sub-task ST5, and the sixth sub-task ST6, the scheduling module 120 may control the resources 310_1, 310_2, ... 310_n to use a fourth pruned neural network for the fourth sub-task ST4, a fifth pruned neural network for the fifth sub-task ST5, and a sixth pruned neural network for the sixth sub-task ST6.

Any one of the fourth sub-task ST4, the fifth sub-task ST5, and the sixth sub-task ST6 may be a task for which a neural network is not used. In this case, a pruned neural network is not used for a task for which a neural network is not used, and scheduling may be performed according to an existing method.

Figure 9:
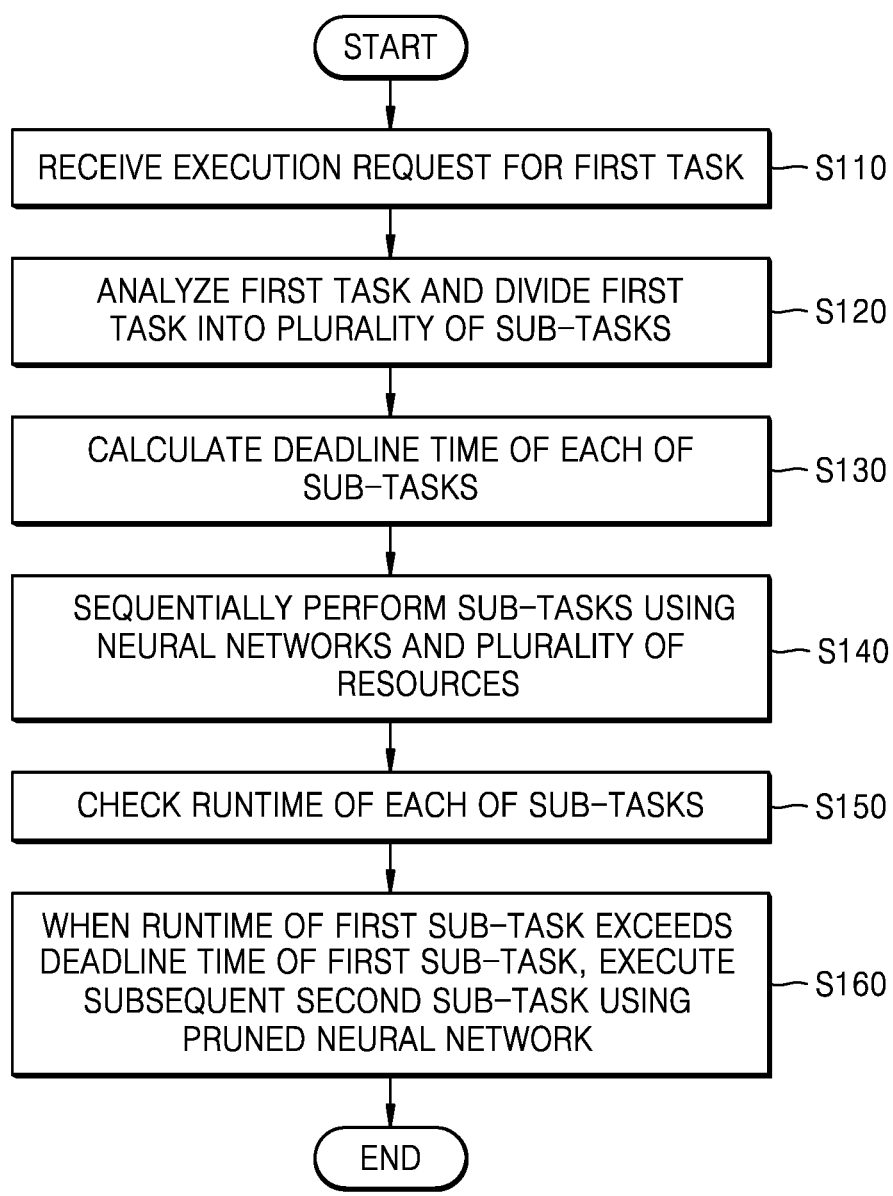
FIG. 9 is a flowchart of a task execution method according to an example embodiment.

FIG. 9 is a flowchart of a task execution method according to an example embodiment. For example, FIG. 9 is a flowchart of a method of executing a task, in which the method may be performed by the processor 100 of FIG. 1.

Referring to FIG. 9, the processor 100 may receive a request to execute a first task (operation S110).

The processor 100 may analyze the first task, and divide the first task into a plurality of sub-tasks (operation S120). In an example embodiment, the processor 100 may divide a first task into a plurality of sub-tasks based on various criteria like types and sizes of input and output data, types of calculations, and types of neural networks used for processing tasks, etc. The processor 100 may generate a workflow to which an order of executing the sub-tasks is reflected. For example, the workflow may be implemented in the form of a directed acyclic graph (DAG).

The processor 100 may calculate a deadline time of each of the sub-tasks (operation S130). For example, the processor 100 may first calculate expected runtimes of the sub-tasks. The expected runtimes of the sub-tasks may be calculated based on a previous history of executing sub-tasks that are the same as or similar to the sub-tasks. Next, the processor 100 may identify all paths in the workflow of the first task and determine a path corresponding to the longest expected runtime from among the identified paths as the expected runtime of the first task. Here, a path refers to a route starting from a first sub-task of a workflow and arriving at the last sub-task, and the expected runtime of each path may be calculated as the sum of expected runtimes of sub-tasks constituting the path. The task analyzing module 110 may calculate ratios of the expected runtimes of the sub-tasks with respect to the expected runtime of the first task, and calculate deadline times corresponding to the calculated ratios.

The processor 100 may sequentially perform a plurality of sub-tasks using neural networks and the resources 310_1, 310_2, ... 310_n (operation S140). For example, the processor 100 may sequentially allocate the sub-tasks to the resources 310_1, 310_2, ... 310_n according to an execution order of the workflow. At this time, the processor 100 may allocate a sub-task to allocate to a resource that may start fastest and, when execution of one sub-task is completed, the processor 100 may schedule a next sub-task. Next, the resources 310_1, 310_2, ... 310_n may perform the allocated sub-tasks using neural networks. The neural networks that are used at this time are neural networks that are not pruned.

The processor 100 may check the runtime of each of the plurality of sub-tasks (operation S150). For example, the processor 100 may check whether the runtimes of the sub-tasks exceed the deadline times of the sub-tasks.

When the runtime of a first sub-task exceeds the deadline time thereof, the processor 100 may perform a subsequent second sub-task using a pruned neural network (operation S160). In an example embodiment, the processor 100 may control the resources 310_1, 310_2, ... 310_n to select one of a plurality of pruned neural networks generated by pruning a neural network corresponding to the second sub-task at different pruning rates, and execute the second sub-task using the selected pruned neural network. The processor 100 may select a pruned neural network using a time delay during the execution of the first sub-task and/or information regarding accuracies of a plurality of pruned neural networks.

In another example embodiment, when the processor 100 is unable to reduce the runtime of the subsequent second sub-task by as much as a time delay while using a pruned neural network with respect to the second sub-task, the processor 100 may control the resources 310_1, 310_2, ... 310_n to use a pruned neural network for a third sub-task subsequent to the second sub-task.

Meanwhile, the processor 100 may generate a pruned neural network in advance. For example, the processor 100 may generate a pruned neural network for each neural network provided to perform a task. In this case, the processor 100 may generate a plurality of pruned neural networks by pruning one neural network using a plurality of pruning rates. Next, the processor 100 may calculate the accuracy of each of the pruned neural networks.

Figure 10:
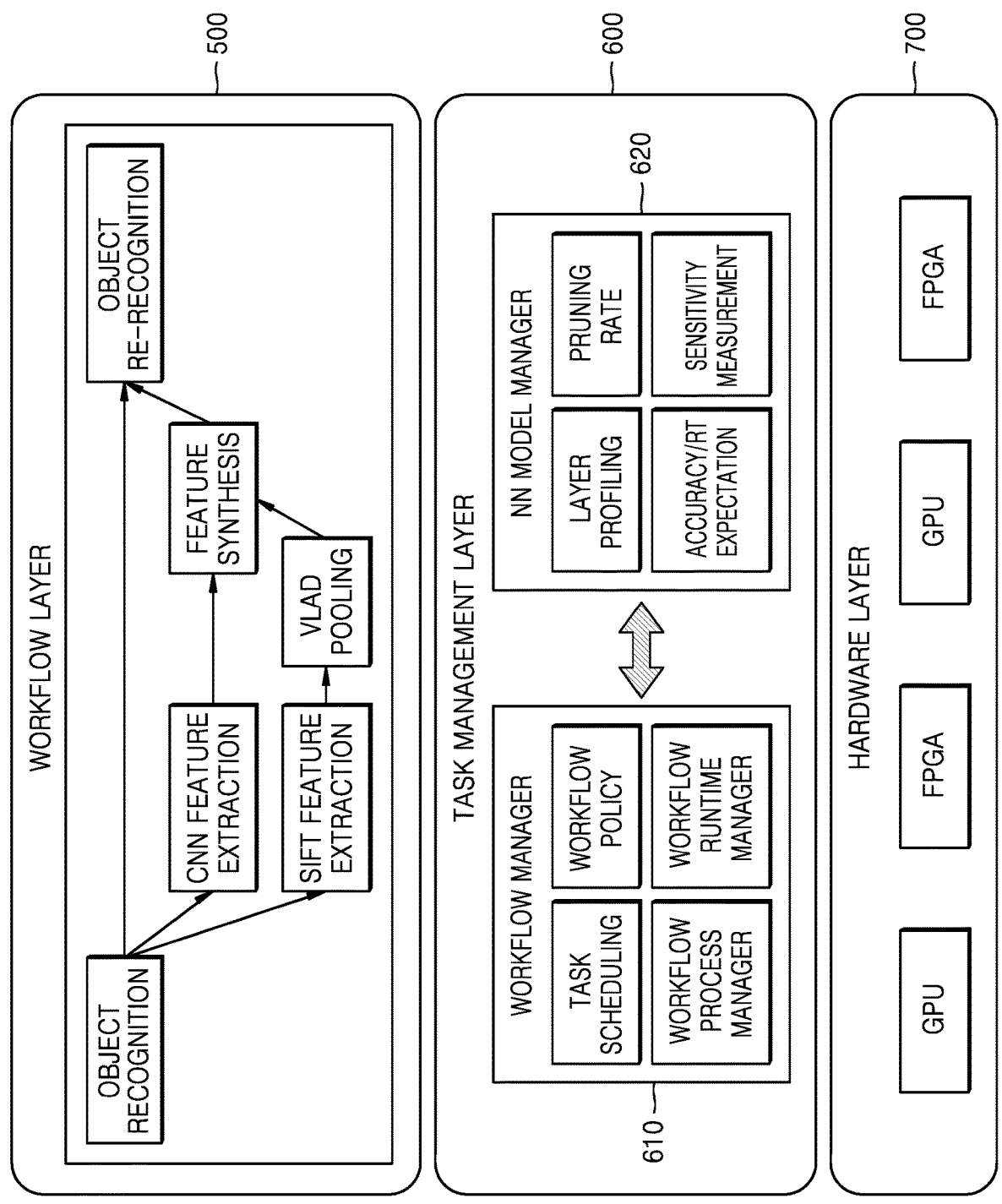
FIG. 10 is a diagram showing an electronic device including a plurality of layers according to an example embodiment.

FIG. 10 is a diagram showing an electronic device including a plurality of layers according to an example embodiment.

Referring to FIG. 10, an electronic device 400 may include a workflow layer 500, a task management layer 600, and a hardware layer 700. The descriptions given above with reference to FIGS. 1 to 9 may be applied to the workflow layer 500, the task management layer 600, and the hardware layer 700, and thus, descriptions identical to those given above will be omitted.

The workflow layer 500 may analyze a requested task and divide the requested task into a plurality of sub-tasks. For example, when the requested task is a video stream processing operation, the workflow layer 500 may analyze the video stream processing operation and divide the video stream processing operation into an object recognition task, a convolutional neural network (CNN) feature extraction task, a scale invariant feature transform (SIFT) feature extraction task, a vector of locally aggregated descriptors (VLAD) pooling task, a feature synthesis task, and an object re-recognition task.

The task management layer 600 may include a workflow manager 610 and a neural network model manager 620.

The workflow manager 610 may include a task scheduling function that allocates a plurality of sub-tasks to resources of the hardware layer 700. The workflow manager 610 may include a workflow policy regarding generation of a workflow. The workflow manager 610 may include a workflow process manager that manages processes that perform all operations for processing a workflow. The workflow manager 610 may include a workflow runtime manager that manages runtimes of sub-tasks of a workflow.

The neural network model manager 620 may include a layer profiling function that derives features of each layer of a neural network. The neural network model manager 620 may manage a plurality of pruning rates related to an operation of pruning a neural network. The neural network model manager 620 may calculate an accuracy and an expected runtime (RT) of a pruned neural network. The neural network model manager 620 may calculate or measure a sensitivity of a pruned neural network.

The hardware layer 700 may include a plurality of resources. For example, the hardware layer 700 may include a plurality of GPUs and a plurality of FPGAs, which may process the plurality of sub-tasks allocated to the hardware layer 700.

Figure 11:
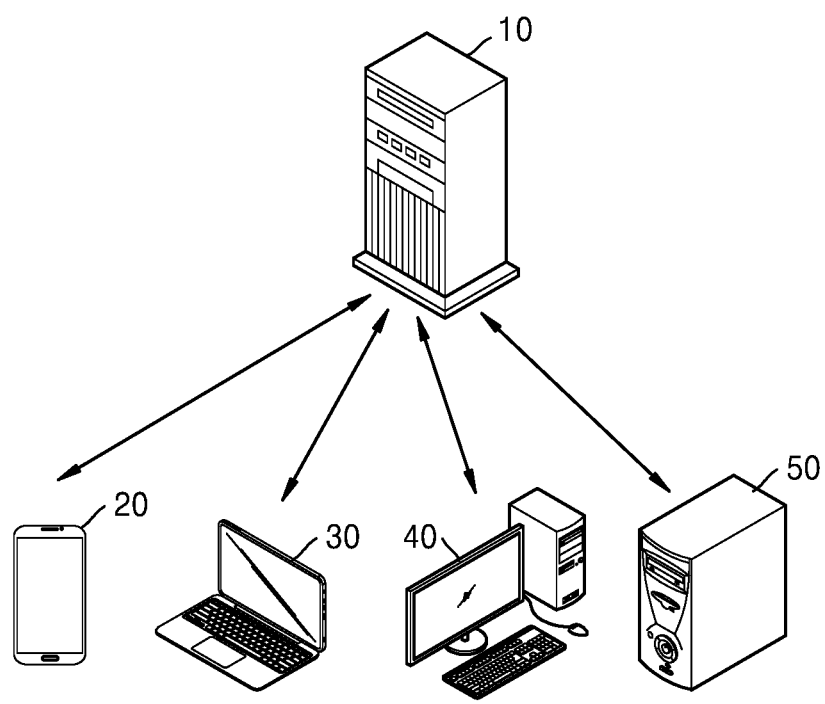
FIG. 11 is a diagram showing an edge computing system according to an example embodiment.

FIG. 11 is a diagram showing an edge computing system according to an example embodiment.

A structure of an edge computing system may contrast that of a cloud computing system. The edge computing system first processes data through nearby electronic devices (e.g., a smartphone, a wearable device, a smart home sensor, a mobile processor, etc.) and then performs additional tasks using data processed through a separate device or service (e.g., a cloud data center) at a remote location.

Referring to FIG. 11, the edge computing system may process data through electronic devices 20, 30, 40, and 50 located nearby, and the electronic devices 20, 30, 40, and 50 may perform secondary tasks through communication with a cloud data center 10 at a remote location.

According to an example embodiment, any of the electronic devices 20, 30, 40, and 50 may correspond to the electronic device 1000 described above with reference to FIGS. 1 to 9. Also, according to the embodiment, when the electronic device 1000 and the resource 300 are implemented as separate components, each of the electronic devices 20, 30, 40, and 50 may correspond to the electronic device 1000 or the resource 300.

By way of summation and review, to reduce a processing time of a convolutional layer of an artificial neural network, methods of increasing data reuse and reducing accesses to an external memory have been generally considered. Services using a deep learning neural network, from among artificial neural networks, are being developed. Because a deep learning neural network may exhibit low data locality and low data reuse, it may be difficult to reduce a processing time. Therefore, a scheduling method to prevent violation of service times may be used to provide a service using a deep learning neural network.

As described above, embodiments relate to a task execution method of performing subsequent processes using a pruned neural network when a delay occurs during execution of a task using a neural network and an electronic device using the task execution method.

Embodiments may provide a task execution method of performing subsequent processes using a pruned neural network when a delay occurs during execution of a task using a neural network, and an electronic device using the task execution method.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A task execution method, comprising:
    receiving an execution request for a first task;
    analyzing the first task and dividing the first task into sub-tasks, the sub-tasks including a first sub-task and a second sub-task;
    calculating respective deadline times of the sub-tasks;
    scheduling the sub-tasks for processing by resources, the resources using neural networks;
    sequentially executing the sub-tasks using the resources and the neural networks;
    checking whether respective runtimes of the sub-tasks exceed a corresponding deadline time; and
    executing the second sub-task, subsequent to executing the first sub-task, using a first pruned neural network generated from the neural networks when the checking indicates that the runtime of the first sub-task exceeds the deadline time of the first sub-task.

2. The task execution method as claimed in claim 1, wherein:
    the first pruned neural network is selected from pruned neural networks that are generated from the neural networks and have respectively different pruning rates, and
    the first pruned neural network is selected when the checking indicates that the runtime of the first sub-task exceeds the deadline time of the first sub-task.

3. The task execution method as claimed in claim 2, wherein the first pruned neural network is selected considering an accuracy of each of the pruned neural networks having the respectively different pruning rates.

4. The task execution method as claimed in claim 1, further comprising:
    when an amount of reduction of the runtime of the second sub-task using the first pruned neural network is less than an amount of the runtime of the first sub-task that exceeds the deadline time of the first sub-task, executing a third sub-task subsequent to the second sub-task using a second pruned neural network.

5. The task execution method as claimed in claim 1, wherein the calculating of the respective deadline times of the sub-tasks includes calculating an expected runtime of each of the sub-tasks.

6. The task execution method as claimed in claim 5, wherein, in the calculating of the expected runtime of each of the sub-tasks, the expected runtime of each of the sub-tasks is calculated based on a previous execution history of a sub-task that is identical to or similar to each of the sub-tasks.

7. The task execution method as claimed in claim 1, wherein, in the analyzing of the first task and dividing of the first task into the sub-tasks, the first task is divided into the sub-tasks based on neural network models available for execution of the first task.

8. The task execution method as claimed in claim 1, wherein the resources include a graphics processing unit and a field-programmable gate array that use the neural networks.

9. The task execution method as claimed in claim 1, wherein, in the scheduling of the sub-tasks for processing by the resources, when execution of one sub-task is completed, a next sub-task is scheduled.

10. The task execution method as claimed in claim 1, further comprising generating pruned neural networks by pruning the neural networks, wherein the first pruned neural network is one among the generated pruned neural networks.

11. The task execution method as claimed in claim 10, wherein:
the generating of the pruned neural networks by pruning the neural networks includes generating a plurality of pruned neural networks for each neural network based on a plurality of pruning rates, and
in the executing of the second sub-task, the first pruned neural network is one among a plurality of pruned neural networks generated based on the plurality of pruning rates and corresponding to the second sub-task.

12. The task execution method as claimed in claim 10, wherein the generating of the pruned neural networks by pruning the neural networks includes:
generating accuracy information regarding the pruned neural networks; and
calculating expected runtimes of the pruned neural networks.

13. An electronic device, comprising:
a plurality of resources including a field-programmable gate array and a graphics processing unit, the plurality of resources comprising processors, the processors being configured to operate using neural networks; and
a processor configured to analyze a first task, divide the first task into sub-tasks, calculate respective deadline times of the sub-tasks, and schedule the sub-tasks for processing by the plurality of resources using the neural networks,
wherein the processor is further configured to, when a runtime of a first sub-task from among the sub-tasks exceeds a deadline time of the first sub-task, schedule a second sub-task for execution subsequent to the first sub-task using a first pruned neural network, the first pruned neural network being generated by pruning a neural network corresponding to the second sub-task.

14. The electronic device as claimed in claim 13, wherein:
the first pruned neural network is one of a plurality of pruned neural networks corresponding to a plurality of pruning rates, and
the processor is configured to select among the plurality of pruned neural networks based at least in part on a time delay of the first sub-task.

15. The electronic device as claimed in claim 14, wherein, when an expected reduction in a runtime of the second sub-task using the first pruned neural network is less than the time delay, the processor is configured to schedule a third sub-task for execution subsequent to the second sub-task using a second pruned neural network, the second pruned neural network being generated by pruning a neural network corresponding to the third sub-task.

16. The electronic device as claimed in claim 14, wherein the processor is configured to select among the plurality of pruned neural networks based on the time delay of the first sub-task and an accuracy of each of the plurality of pruned neural networks.

17. The electronic device as claimed in claim 13, wherein the processor is configured to control the graphics processing unit to execute the second sub-task using the first pruned neural network.

18. The electronic device as claimed in claim 13, further comprising a memory configured to store the neural networks and store pruned neural networks generated by pruning the neural networks.

19. The electronic device as claimed in claim 13, wherein the field-programmable gate array is programmed to implement the neural networks and programmed to implement the first pruned neural network under control of the processor.

20. A task execution method, comprising:
storing a plurality of neural networks and a plurality of pruned neural networks generated by pruning the plurality of neural networks;
generating a workflow represented by sub-tasks that constitute a first task, when a request for the first task is received;
sequentially scheduling each of the sub-tasks to one of a plurality of resources according to an execution order of the workflow, and controlling each of the plurality of resources to use a neural network corresponding to a scheduled sub-task;
checking whether a runtime of the scheduled sub-task exceeds a deadline time of the scheduled sub-task;
scheduling a next sub-task to one of the plurality of resources when the runtime of the scheduled sub-task does not exceed the deadline time of the scheduled sub-task; and
when the runtime of the scheduled sub-task exceeds the deadline time of the scheduled sub-task, controlling one of the plurality of resources to process a next sub-task using a pruned neural network.

* * * * *